Patented Mar. 22, 1938

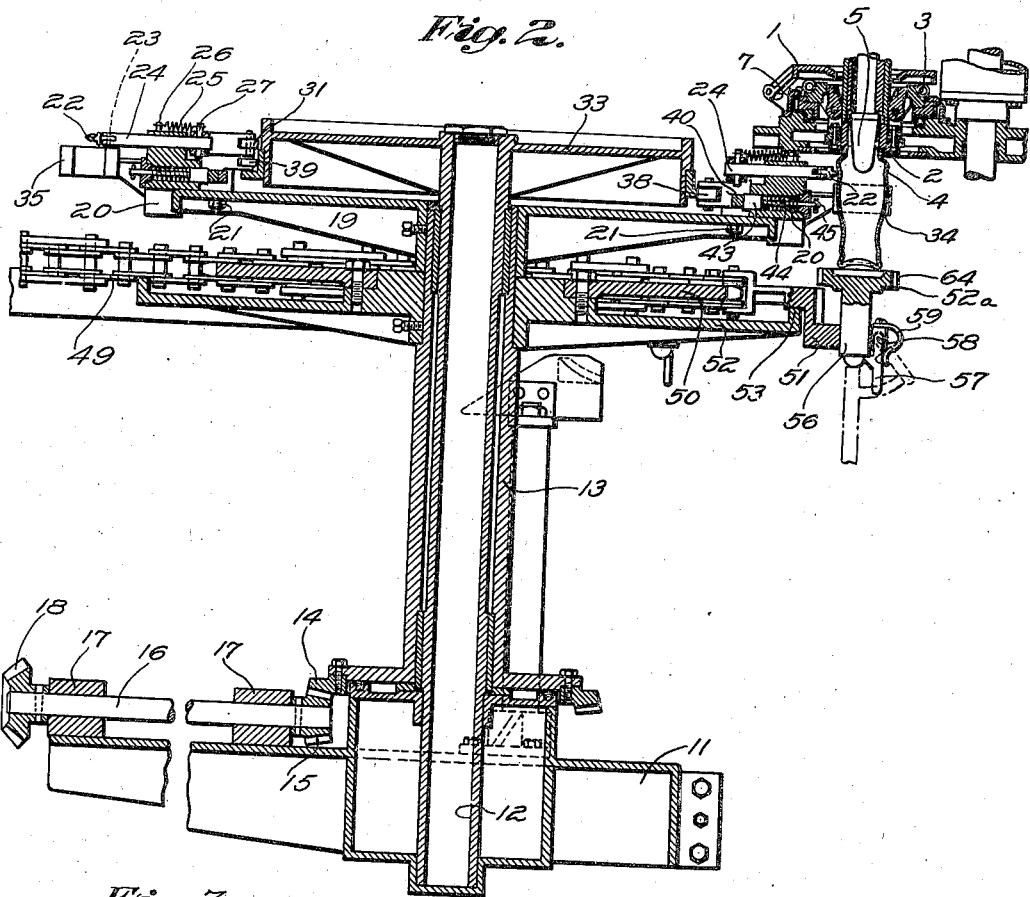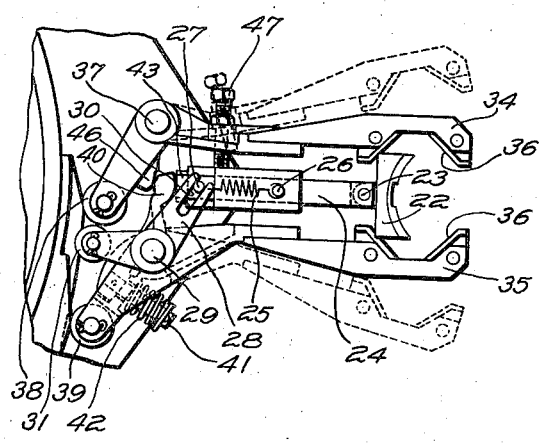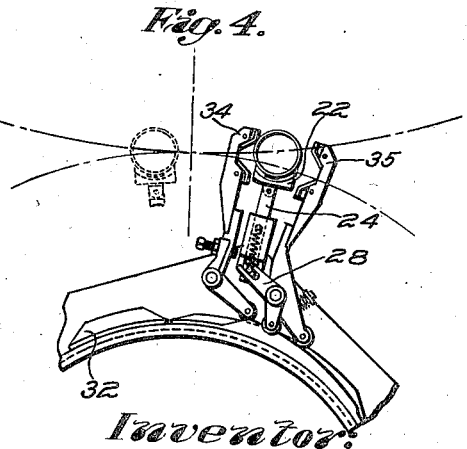

2,112,118

UNITED STATES PATENT OFFICE 2,112,118

ARTICLE HANDLING AND CRACK-OFF MEANS PARTICULARLY FOR USE IN THE MANUFACTURE OF PASTE-MOLD TYPE GLASSWARE

George E. Rowe, Wethersfield, Conn., assignor to Hartford-Empire Company, Hartford, Conn., a corporation of Delaware Application January 18, 1935, Serial No. 2,415

9 Claims. (Cl. 49—14)

This invention relates to article handling means which have general utility and which also have particular utility in conjunction with the manufacture of glassware by the so-called "paste mold" process. It is especially applicable to apparatus for use in the manufacture of paste mold glass articles, such for example as tumblers, wherein means are provided for separating or cracking off the desired glass article from the moil or rim which is formed integral therewith and which is later separated therefrom and discarded, this separating operation taking place before the moil has been released from the unit of the forming machine in which the glass article was formed. The present invention further includes the foregoing in combination with means by which glass articles may be suitably handled in such a manner that the sharp edge produced by the cracking off operation, if such be used will be fire-finished as a part of a substantially continuous operation, thus eliminating many of the difficulties which have arisen in the practice of prior methods.

Among the objects of the present invention are to provide article handling means, comprising cooperating tongs members and automatic means for operating such tongs members in such manner that the members may be simultaneously or differentially operated in their opening and closing movements for achieving particular results.

For example, it sometimes happens that tongs members usable for removing glass articles from a rotary type machine, particularly one which is continuously rotated, must be operated in a particular manner so as to clear certain parts of the forming machine, and for this purpose it may be desirable to move the tongs members toward their closed position differentially, that is, to move one tongs member part or all the way toward its closed position in advance of all or a part of the movement of another or the other cooperating tongs member.

This differential movement may also be useful in effecting a simultaneous opening and closing of cooperating tongs members in such manner that the opening may be accomplished in two or more stages while the closing may be effected by a single operation or in two or more stages. Such an operation may have particular utility, for example, in the placing of glass articles so closely adjacent to each other that if the tongs members were opened completely in releasing a glass article held therein, there would be danger of the opening movement of these members causing them to contact with and possibly knock over adjacent glass articles.

A further advantage of the present invention is in grasping and/or releasing glass articles in transferring such articles from one point to another in such manner that the articles may be steadied both in the grasping and releasing thereof and prevented from toppling over, as for example, in placing articles on a continuously moving conveyor. The present invention provides means by which tongs members may be operated individually and differentially or simultaneously in order to achieve any of the above mentioned results.

In the manufacture of paste mold articles wherein my invention has peculiar utility, it has been the practice in the past to carry on one or the other of two processes, first, the glass articles with the moil which is formed integrally therewith and which must thereafter be separated have been transferred to the lehr subsequent to their discharge from the forming machine, and then after annealing the articles have been scored and cracked off and the sharp edge thereafter fire finished. Second, the articles have been first released from the forming machine and thereafter separated from the moil and simultaneously fire finished by the use of an oxygen-flame and subsequently annealed.

In the event that the articles are first annealed prior to a cracking off of the moil, the amount of handling which has been necessitated has been excessive and has in practice resulted in relatively high breakage. On the other hand, the burning off of the moil with an oxygen flame after removal of the articles from the forming machine and prior to annealing has saved a certain amount of handling, but the oxygen required is expensive. This latter process has also presented the further difficulty that often there is a thickened portion or droplet in the rim of the completed article, probably at the point where final separation from the moil takes place, which renders the articles salable only at a reduced price, if at all.

My present invention seeks to overcome some at least of the difficulties inherent in the prior practices as above outlined, minimizing the handling costs of previous processes by accomplishing the entire operation automatically and without resorting to any manual handling operation, and further in a specific case, by employing a completely automatic cracking off operation rather than burning off the moil, thus saving the cost of the oxygen used in the burning off process.

A further and more specific object of the present invention is to provide scoring means cooperating with the glass articles while they are still retained in and preferably also are being rotated by the portion of the forming machine in which the moil is grasped, in such a manner that the scoring is effected by bringing a suitable tool into engagement with the glass during the rotation thereof in and by the forming machine to form a score line completely around the article at the desired point of severance. Thereafter the desired article may be cracked off from the moil leaving it still grasped in the machine to be later discharged, suitable ware handling means being provided for steadying and receiving the articles as cracked off and for conveying them directly to and through a fire finishing chamber or oven from whence they may be conveyed automatically to the lehr for annealing, thus rendering the entire operation completely automatic.

Other and more specific objects of the present invention will become apparent from the following description of a preferred embodiment of my invention when taken in conjunction with the accompanying drawings, in which:

Fig. 2 is a vertical section on the line 2—2 of Fig. 1;

Figure 1:
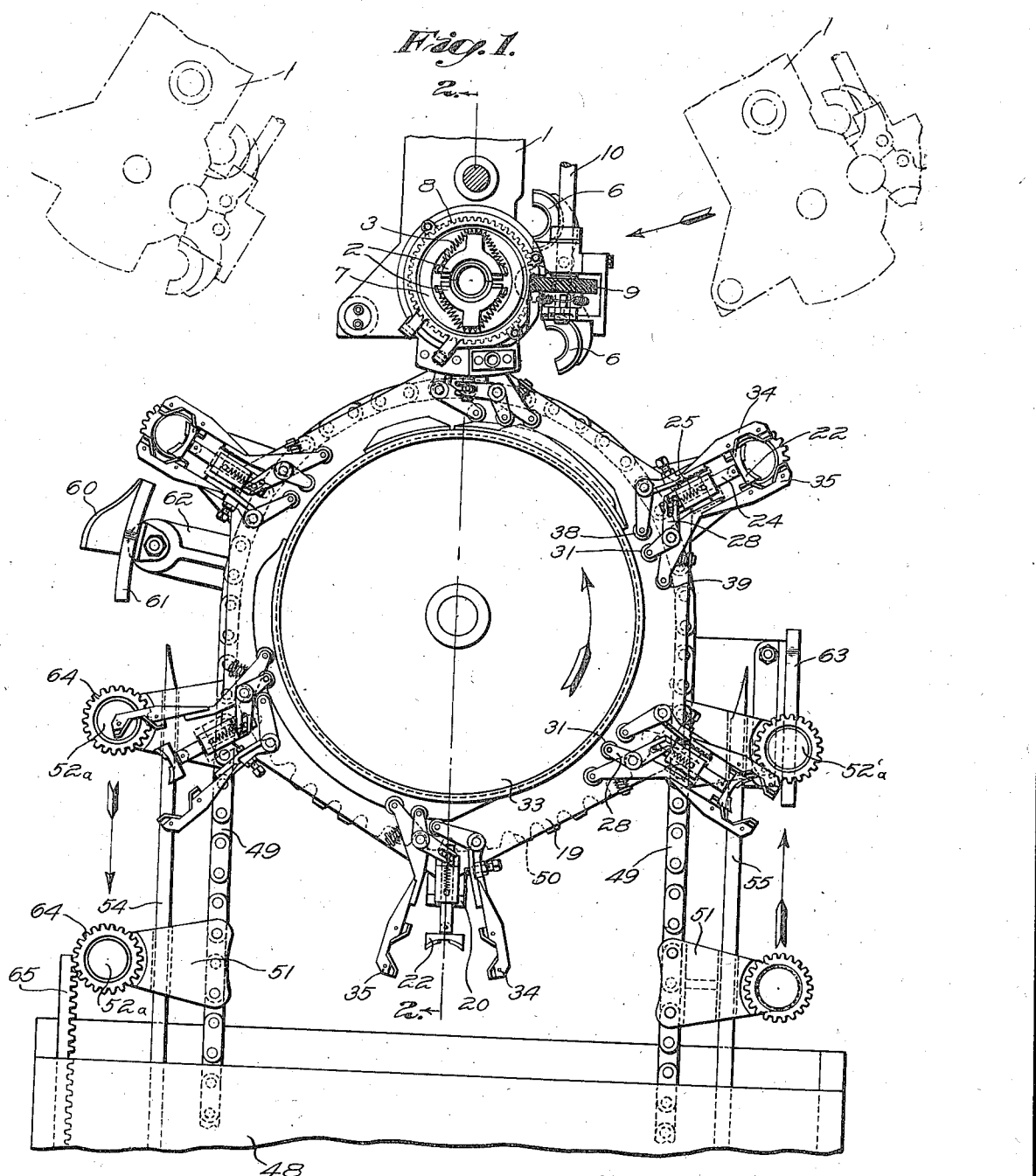
Figure 1 is a plan view showing the main portion of my device and its relation to a paste mold type forming machine and a fire finishing chamber or oven, the forming machine and fire finishing chamber or oven being merely shown diagrammatically.

Fig. 3 is an enlarged detail view in plan showing one of the heads of my device and particularly showing the construction and operating means for the scoring cutter and the tongs; and Fig. 4 is a fragmentary view in plan, and similar to Fig. 3, showing the functional relations of the scoring cutter and tongs in cracking off a glass article, the moil of which is still retained in the grasping means of the forming machine.

While I contemplate that my device may be used in conjunction with many different types of paste mold machines, for example, either straight line or rotary type and either intermittent or continuous machines, I have chosen to illustrate the invention as associated with a continuous rotary type of paste mold machine which is known in the art as the "Hartford 28 Machine". This machine was shown and described in detail in my prior Patent 1,979,211, granted October 30, 1934. The machine has a plurality of forming units thereon, three of which are indicated in Figs. 1 and 2 at 1, the center unit of Fig. 1 being illustrated in some detail.

It will be understood that these units are suitably supported upon a continuously rotated turret or carrier and are provided with all the necessary forming means completely to form an article of the paste mold type, for example a tumbler. As shown, particularly in Fig. 1, each of the forming units comprises a pair of gripping jaws 2 which are normally spring-pressed together by springs 3 and which engage the moil 4 of a glass article. The forming means which, however, form no part of the present invention include a combined press and blow head 5 and a final blow mold 6, the latter being formed in complementary halves in the usual manner. It will be understood that suitable means are provided for operating these forming means as set forth in detail in my prior patent above referred to.

The jaws or grippers 2 are mounted in a neck ring carrier 7 (Figs. 1 and 2), which is provided on its periphery with suitable spiral gear teeth 8 meshing with a spiral gear 9 carried by the shaft 10 and arranged for rotation at the desired times by means included in the forming machine as set forth in my prior patent.

Thus, at the time the forming unit carrying a completed glass article comes into the zone adjacent to the device of my present invention, the article is still grasped by the grasping means 2 of the forming machine and may, if desired, be rotated. Such rotation may be employed in carrying out the purposes of my present invention.

Adjacent to the forming machine is mounted a suitable base 11 which may be and preferably is secured to the base (not shown) of the forming machine proper. The base 11 carries a stationary column 12 stepped therein as illustrated in Fig. 2. Supported on the base 11 and arranged for rotative movement around the column 12 is a rotatable support 13 by which the various heads each including a glass severing means, here shown as a scoring tool and tongs members hereinafter to be described are carried.

Means are provided for rotating the support 13, such means comprising an annular beveled ring gear 14 carried by the support 13 and meshing with a pinion 15 which is carried by the inner end of a shaft 16 journaled in bearings 17 on the base 11. The opposite end of the shaft 16 carries a beveled pinion 18 which may be driven from any suitable source of power, preferably the same as the power drive for the forming machine. In a preferred embodiment of my invention, the bevel gear 18 is driven directly or through suitable gearing from the forming machine.

At the upper end of the rotatable structure 13 is a table-like member 19 by which the several crack off units are directly carried. Each of the crack off and tongs units comprises a supporting structure 20 which may be suitably secured to the table 19 as by bolts 21 (Fig. 2).

My invention as illustrated in the drawings includes a scoring tool generally indicated at 22, which may be provided with a suitable hard scoring edge of any desired material. The tool 22 is mounted by a vertical pivot or pintle 23 on the outer end of a sliding arm 24 which is substantially radially slidable in a guideway member 20.

Means are provided for resiliently urging the arm 24 radially outwardly of the supporting structure 13, such means comprising a tension spring 25 extending between a fixed anchorage 26 on the structure 20 and a pin 27 carried by the arm 24. For moving the scoring tool 22 radially inwardly against the tension of the spring 25, there is provided a bell crank 28 pivoted intermediate its ends on a vertical pintle 29 rigid with or carried by the structure 20 and having one of its arms bifurcated as at 30 to embrace the pin 27. The other arm of the bell crank 28 carries a cam roller 31 for cooperation with a stationary cam best shown at 32 (Fig. 4), which is rigidly but adjustably secured to a stationary cam drum 33 (Figs. 1 and 2), the latter in turn being carried by the stationary column 12 as best shown in Fig. 2.

Thus, when it is desired to move the scoring tool 22 out of contact with the glass, the roller 31 is caused to ride up on to a high portion of the cam 32. When it is desired to cause the scoring tool to engage and score a glass article, the cam 32 is relieved to permit the spring 25 to move the scoring tool 22 into engagement with the glass.

The mounting of the scoring tool 22 as hereinabove described enables this tool substantially to follow a glass article through a material zone of angular travel of the forming machine and the rotary support 13, so that the scoring tool may engage and score a glass article from a point substantially as shown in full lines in Fig. 4 to a point at or slightly over the line of centers of the forming machine and the rotary support 13, possibly up to the position shown in dotted lines in Fig. 4. The automatic positioning of the scoring tool is facilitated by the re-entrant contour thereof which is adapted substantially to conform to the exterior contour of a glass article to be scored.

It will be understood that these scoring tools are interchangeable in practice, so that if one becomes worn for any reason, a new one can be inserted in place thereof; and also when it is desired to manufacture articles of different contour, a suitably shaped scoring tool may be employed for use therewith. The substitution may be made by removing the scoring tool from the arm 24 at the pintle 23 which is preferably made removable for this purpose.

Associated with each of the scoring tools 22 on the rotary carrier is a pair of cooperating tongs members indicated at 34 and 35. These members may in a broad sense be used for grasping bottles or other articles, but also have general utility apart from their particular usefulness hereinafter to be specifically described.

The tongs members 34 and 35 are provided with suitable shaped grasping, or in the present particular embodiment of the invention, guiding portions illustrated at 36 which are preferably interchangeable and made generally to conform to the configuration of the particular articles to be handled.

The tongs members 34 and 35 are mounted on spaced vertical pivotal axes or pintles, here shown at 37, for the tongs members 34 and 29 for the tongs member 35. The pintles 37 and 29 may be secured either in the housing member 20 or directly to the horizontal flange portion of the table 19 as may be desired.

The arms forming the tongs members are extended on the opposite sides of their respective pintles as shown best in Fig. 3 and are provided at their ends with cam rollers 38 and 39 respectively. These cam rollers respectively cooperate with stationary but preferably adjustable cams carried by the periphery of the stationary cam drum 33, the cams being suitably shaped to perform the desired operations as will be hereinafter set forth and preferably being adjustable around the periphery of the cam drum 33 in order to cause the several operations to be performed at the desired zones in the path of travel of the tongs about the drum.

Pivotally mounted coaxially with the tongs member 35 on the pintle 29 and free to move in respect thereto is a rocker lever 40, which is normally held in a fixed position in respect to the tongs member 35 by resilient means including a stud 41 rigidly carried by the rocker lever 40 and extending loosely through an aperture in a web of the tongs member 35. Extending between this web and a suitable stop washer on the stud 41 is a compression spring 42, the arrangement being such that the rocker lever 40 may have a certain limited movement clockwise in respect to the tongs member 35 against the compression of the spring 42 from its normal position, but the normal relative position of these parts will be restored as soon as such action is permitted, due to the expansion of the spring 42, which will cause one end of the rocker lever 40 to lie against the depending web of the tongs member 35.

The other arm of the rocker lever 40 is arranged to be engaged by a spring pressed plunger 43 as best seen in Fig. 2, this plunger being mounted in a suitable bore in the housing member 20 and being spring pressed radially inwardly of the rotary carrier 13 by a compression spring 44 as illustrated in Fig. 2. Excessive movement of the plunger 43 inwardly under the influence of the spring 44 is prevented by providing the plunger with a stem 45 extending coaxially through the spring and through the head against which the spring abuts and having on its outer end a suitable stop secured thereto. Thus the compression of the spring 44 acting through the plunger 43 and rocker lever 40 will be effective to exert force tending to move the tongs member 35 toward its closed position and tending to move the cam roller 39 away from its associated cam.

The arm of the tongs member 34 which carries the cam roller 38 is provided with an abutment 46 bearing against the outer end of the rocker lever 40 opposite that portion thereof which contacts with the plunger 43, so that the force of the spring 44 acting through the plunger 43 and the end of rocker lever 40 will be effective against the abutment 46 to tend to move the tongs member 34 clockwise as seen in Fig. 3, thus tending to close this tongs member. This action, however, tends to urge the cam roller 38 toward its associated cam.

The effect therefore of the operation of the plunger 43 under the influence of the spring 44 is to tend to urge the tongs members 34 and 35 toward their closed position. The rate at which these tongs may close depends on the configuration of the cam associated with cam roller 38 which in turn is carried by the tongs member 34 (assuming for the moment that the rocker lever 40 and the tongs member 35 have no relative movement). Thus, as the cam associated with cam roller 38 is gradually relieved, the compression spring 44 will be effective through the mechanism described to close the tongs members at the rate at which such action is permitted by the cam. The limit of the closing movement of the tongs member 34 is adjustably predetermined by a suitable set screw 47 threaded through a portion of the arm of this tongs member and bearing against a suitable abutment which may be part of the housing member 20. This set screw may be secured in adjusted position by the usual jam nut as illustrated.

When it is desired to open the tongs simultaneously, the cam roller 38 may be caused to ride up on to a high point of its associated cam which will serve to open the tongs member 34 positively and will act through the abutment 46, the rocker lever 40 and the compression spring 42 to exert a resilient opening movement to tongs member 35, subject of course to there being a suitable relief of the cam with which the cam roller 39 is associated to permit such movement (it being still assumed that there is no relative movement between rocker lever 40 and tongs member 35).

When, for example, it may be desired to accomplish a differential movement of the tongs members, this may be accomplished by providing cams cooperating with cam rollers 38 and 39 having suitable configurations. For instance, if cam roller 38 is traveling along a portion of its cooperating cam which is of even height, so that no closing movement of tongs member 34 is permitted, and it is desired to provide a closing movement for tongs member 35, the cam roller 39 is caused to ride onto a high point of its associated cam. Due to the fact that cam roller 38 and its associated tongs member having no movement relative to the support 13, the rocker lever 40 likewise has no movement about the pintle 29. However, under these circumstances tongs member 35 may be moved toward its closed position by cam roller 39 riding up its associated cam and causing a compression of spring 42 accompanied by a relative movement between tongs member 35 and the rocker lever 40. This function may be employed in the device particularly illustrated herein to cause the tongs member 35 to move forwardly by a relatively quick movement to impact the glass subsequent to the completion of the scoring thereof and crack off the desired glass article from the moil, tongs member 34 being held in a fixed position during such movement merely for guiding the glass article after it has been cracked off.

On the other hand, assuming that the tongs members are both in their fully closed position and it is desired to open them differentially, this may be accomplished by causing cam roller 39 to ride along a constant high section of its associated cam and causing the cam roller 38 to ride up onto a high portion of its associated cam. Under these circumstances, tongs member 35 cannot be opened due to the constant level portion of the cam opposite the cam roller 39. The tongs member 34 may be positively opened by the cam roller 38 riding up an incline of its associated cam. This operation will also cause clockwise movement of rocker lever 40 about pintle 29, due to the engagement of the abutment 46 with the upper end (as seen in Fig. 3) of the rocker lever. This action will take place against the compression of spring 44 due to the radial outward movement of the plunger 43. Also due to the clockwise movement of rocker lever 40 about the pintle 29, and the fact that tongs member 35 is stationary, compression spring 42 will be compressed which will tend to retain the cam roller 39 against its associated cam.

This operation may be of advantage when placing an article gripped in tongs of the type here shown upon a moving conveyor in a combination in which the tongs are carried by a rotary carrier, as in the device here illustrated, and the conveyor is moving in a path substantially tangent to the movement of the tongs. Under these circumstances, it may be desirable to move the leading tongs member 34 away from the article in advance of the movement of the following tongs member 35 away from such article, thus permitting the article to move off in its tangent path while steadying it by the following tongs member.

It will be understood that by a suitable interchange of the operating mechanisms, a differential movement of the tongs could be effected such that the leading tongs member would close first and open second in respect to the following tongs member. With the device arranged as shown in the accompanying drawings, however, the leading tongs member may be opened in advance of the following tongs member or simultaneously therewith, and the following tongs member may be closed in advance of the leading tongs member or simultaneously therewith, both subject to the configuration of their respectively associated cams.

Means are preferably provided according to my invention for receiving the glass articles after they have been cracked off or otherwise separated from their moils and for conveying them away from the vicinity of the forming machine and directly to and through a suitable fire finishing chamber or oven, which is used in connection with the cracking off process illustrated.

As shown in Fig. 1, the fire finishing chamber or oven is diagrammatically illustrated at 48 and the conveying means includes a flexible endless sprocket chain 49 which is trained around a suitable sprocket 50 carried by the rotary carrier 13, as best illustrated in Figs. 1 and 2. Secured to the flexible carrier or sprocket chain 49 at spaced intervals therealong are a series of brackets 51 each of which is arranged to carry a bottom plate 52a in a manner hereinafter to be more specifically described.

The brackets 51 are further supported in their travel around the rotary support 13 by a supporting member 52 rigid with such support and having upstanding flange portions 53 upon which the brackets 51 ride. In their movement away from the rotary support 13, the brackets 51 are arranged to slide upon guide rails 54 and 55 (Fig. 1).

The bottom plates 52a are each provided with a cylindrical stem 56 arranged to pass through a cylindrical hole in a depending portion of the bracket 51 as best illustrated in Fig. 2. The bottom plates are thus vertically slidable and rotatable in their supporting brackets.

Means are provided for retaining the bottom plates 52a in their upper positions which it is desired that they occupy during the time the glass articles are received thereon, such means being individual to each plate and including a latch 57 pivoted to the bracket 51 at 58 and spring pressed toward its operative position by a spring 59.

When it is desired that the bottom plates be lowered so as to lower the articles carried thereby to such a point that the top edge thereof is below the level of the tongs members 34 and 35, the stem at the lower end of the latch 57 is moved radially outwardly of the support 13 by a cam shown at 60 in Fig. 1 and the associated bottom plate 52a is then lowered gradually to its lowermost position by a rounded stud at the lower end of the stem 56 thereof sliding down an inclined cam surface 61. The cams 60 and 61 may be suitably secured to a bracket 62 extending upwardly from the base 11 of the rotary carrier or support 13. Lifting movement of the bottom plates to their uppermost position may be accomplished by the provision of a stationary cam 63 (Fig. 1) arranged to engage under and raise the stems 56 of the bottom plates up to the point where their associated latches 57 may be moved thereunder by the springs 59.

During the movement of the bottom plates with the articles thereon through the fire finishing chamber or oven, it is desired that they be rotated to rotate the articles. This action is accomplished by providing gear teeth 64 on the periphery of the bottom plates 52a which are adapted to mesh with a stationary rack bar 65 as best shown in Fig. 1.

The supporting and guiding of the remainder of the flexible carrier 49 through and at the other side of the fire finishing chamber or oven 48 is not illustrated in the accompanying drawings as this mechanism may be entirely conventional. It is contemplated that the drive for the flexible carrier be through the sprocket 50, from the rotary support 13 and the drive thereof, as above set forth.

From the above, it will be seen that I have provided a tongs mechanism of general utility in article handling, specifically wherein cooperating tongs members are made responsive to individual control providing for differential movement between opening and closing, and for relative differential movements as between each other, and that these functions or some of them have peculiar and individual utility in certain instances.

Furthermore, considering the particular problem of forming and handling paste mold articles, it will be seen that my present invention eliminates the excessive handling involved in the present method of first annealing the articles, then scoring them, then cracking off and fire finishing and also eliminates the handling incident to burning off operations performed after the articles with their integral moils have been first discharged from the forming machine. The specific form of the invention here illustrated also eliminates the excessive cost of the other principal prior method of burning off the moil from the desired article by the use of an oxygen flame, as well as eliminating the undesirable feature of the latter method in that the rim at one zone thereof may have a thickened portion or droplet of glass probably at the point where final severance actually occurs giving an uneven rim to the article, which is particularly undesirable in the case of fine tumblers.

I have also provided a simple, cheap and effective method of an apparatus for performing the crack-off, handling and fire finishing operations in an entirely automatic manner and by the use of the rotating means of the forming machine itself in effecting the scoring.

Turning now to a particular desirable cycle of operation and referring to the specific embodiment of the invention here illustrated, the article as formed in the forming machine and with the moil thereof still gripped by the gripping means 2 and rotation still being continued arrives at substantially the point shown in full lines in Fig. 4, the machine being rotated in a clockwise direction. The first operation is the engagement of the re-entrant formed cutting or scoring tool 22 with the glass, which may continue from the full line position shown in Fig. 4 substantially to the dotted line position in that figure. During this period, the tongs 34—35 are in partially or mostly closed position, but still some little distance away from the glass. At about the point shown in dotted lines in Fig. 4, the following tongs member 35 may be given a quick forward movement to impact the glass of the desired article and crack it off from the moil at the score line which has been made. Rotation may cease at about this point and the scoring tool 22 may be withdrawn at or just prior to the point at which the crack off takes place. Both tongs are now substantially closed about the article but not in positive gripping relation thereto and thus guide the article after the crack off down onto the bottom plate 52a, which is just slightly below the level of the bottom of the article before that article has been cracked off, as illustrated in Fig. 2.

Subsequent to the crack off, and after the article is supported on the bottom plate, the tongs still prevent over-turning of the article and move with it up to the point where the bottom plate is lowered by cam 60 tripping the latch 57 and cam 61 permitting the controlled lowering of the bottom plate. The article is now completely beneath the level of the tongs and may travel on a straight tangent path while the tongs continue their rotary path of movement about the axis of the rotatable support 13. At or before this time, the tongs may be opened completely if desired, such opening being illustrated in Fig. 1 of the accompanying drawings.

The bottom plate with the article thereon now moves into the fire finishing chamber or oven 48 and shortly prior to or about the time it enters this chamber the gear teeth 64 on the bottom plate come into engagement with the stationary rack 65 to rotate the article during its travel through the fire finishing chamber or oven. Fire finishing of the article is accomplished within this chamber or oven, after which the article is moved to a point where it may be placed either manually or automatically upon a lehr conveyor for the usual annealing, if such annealing is desired or necessary.

The bottom plates are again elevated in their path at about the time they come again into registry with one of the pairs of tongs members, and under the action of the cam 63 which moves them up to the point where the latch member 57 may snap beneath the rim at the under end of the stem 56 under the influence of the spring 59 for repeating the process.

While I have shown and described but one embodiment of my invention, it may be understood that many changes may be made therein and certain of the instrumentalities and the method may and do have independent utility. I do not wish to be limited therefore except by the scope of the appended claims, which are to be construed as broadly as the state of the prior art permits.

I claim:

1. The combination with a continuously moving paste mold machine for forming articles of glassware, including a means for supporting and imparting rotative movement to a glass article during at least a part of the forming process, of means for separating the glass article from the moil which is integral therewith during the forming process and which is engaged by the supporting means of the machine, the last named means comprising a scoring tool for engaging and scoring the glass at the desired line of separation and while the moil is still supported in and being rotated by said machine, means for moving said tool substantially to follow the movement of an article during the scoring operation, and automatic means for thereafter impacting the glass to crack off the desired article from the moil at the score line and while the moil is still supported by said machine.

2. The combination with a paste mold machine for forming articles of glassware, including a plurality of article forming units rotatable about a common vertical axis and each including a means for supporting and imparting rotative movement to a glass article during a part at least of the forming process, of means for separating a glass article from the moil which is integral therewith during the forming process and which is engaged by the supporting means of the machine, the last named means comprising a support rotatable about a vertical axis eccentric of the first named axis, a plurality of scoring means carried by said support and arranged to engage and score the glass in each of said units at the desired line of separation while the moil of the glass being scored is still supported in and being rotated by said machine, and means also carried by said support for impacting the glass to crack off the desired articles from their respective moils at the score lines and while the moils are still supported by said machine.

3. The combination with a paste mold machine for forming articles of glassware, including a plurality of forming units continuously rotated about a vertical axis, each of said forming units including means for supporting and imparting rotative movement to a glass article about its own axis during at least a part of the forming process, of means for separating each glass article from the moil which is integral therewith during the forming process and which is engaged by the supporting means of the machine, the last named means comprising a support mounted for rotation about a vertical axis eccentric of the axis of said machine, means for rotating said support continuously, a scoring tool carried by said support and spring pressed substantially radially outward in respect thereto for engaging and scoring the glass in one of said units at the desired line of separation while the moil of such glass is still supported in and being rotated by said machine about the axis of the glass article, the mounting and moving means for said scoring tool being so constructed and arranged as to cause said tool substantially to follow the path of a glass article during the movement of the glass and said tool through a substantial zone of angular travel for scoring, and means for thereafter impacting the glass to crack off the desired article from the moil at the score line and while the moil is still supported by said machine.

4. The combination with a paste mold machine for forming articles of glassware, including a plurality of forming units continuously rotated about a vertical axis, each of said forming units including means for supporting and imparting rotative movement to a glass article about its own axis during at least a part of the forming process, of means for separating each glass article from the moil which is integral therewith during the forming process and which is engaged by the supporting means of the machine, the last named means comprising a support mounted for rotation about a vertical axis eccentric of the axis of said machine, means for rotating said support continuously, an arm mounted for substantially radial sliding movement in respect to said support, resilient means for urging said arm outwardly from said support, a scoring tool mounted on the outer end of said arm on a vertical pivotal axis in respect thereto, the scoring tool mounting being so constructed and arranged that said tool engages a glass article supported in one of said forming units and follows such article during a substantial zone of angular travel of the glass and the tool support, whereby continued rotation of the glass by the machine in conjunction with the engagement of said scoring tool is effective to form a score line completely around the glass article at the desired line of separation of the moil from the article, means moving with said scoring tool for impacting the glass to crack off the desired article at the score line and while the moil is still supported by said machine, and means also moving with said scoring tool for removing the glass article from the vicinity of said machine subsequent to the crack-off.

5. The combination with a paste mold machine for forming articles of glassware, including a means for supporting and imparting rotative movement to the articles during at least a part of the forming process, of means for separating a glass article from the moil which is integral therewith during the forming process and which is engaged by the supporting means of the machine, the last named means comprising means to engage and score the glass at the desired line of separation and while the moil is still supported in and being rotated by said machine, tongs associated with the scoring means at least at the time the glass article is to be severed from the moil, means for operating said tongs in such manner as to give an impact to the glass article for cracking it off from the moil and thereafter for guiding the article thus cracked off, and means for supporting the glass articles after they have been separated from the moil.

6. The combination with a paste mold machine for forming articles of glassware, including a plurality of forming units rotated continuously about a vertical axis and each of said units having means for supporting and imparting rotative movement to a glass article about its own axis during a part at least of the forming process, of means for separating a glass article from the moil which is integral therewith during the forming process and which is engaged by the supporting means of the machine, the last named means comprising a support rotating continuously about a vertical axis eccentric of the axis of said machine, means for rotating said support continuously, a scoring tool mounted on said support and constructed and arranged to engage a glass article on said machine and score the glass at the desired line of separation from the moil while the glass is being rotated about its own axis by the supporting means of said machine, tongs associated with said scoring tool at least during the time the glass article is to be separated from the moil, means for operating said tongs first to provide an impact against the glass article to crack it off from the moil at the score line and thereafter to guide the glass article thus cracked off, and a bottom support associated with the scoring tool and said tongs at least during the time a glass article is cracked off as aforesaid for supporting the bottom of the glass article as cracked off by impact of the tongs and thereafter guided thereby.

7. The combination with a paste mold machine for forming articles of glassware, including a means for supporting and imparting rotative movement to the articles about their own axes during at least a part of the forming process, of means for separating a glass article from the moil which is integral therewith during the forming process and which is engaged by the supporting means of the machine, the last named means comprising means to engage and score the glass at the desired line of separation and while the moil is still supported in and being rotated by said machine about its own axis, a pair of cooperating tongs members associated with said scoring means, means for operating said tongs members differentially in such a manner that one of said tongs members will impact the glass article subsequent to the scoring and crack it off from the moil at the score line, a bottom support associated with the tongs members, and means for so operating the tongs at and subsequent to the crack off of the glass article from the moil as to guide the article as cracked off onto said bottom support.

8. The combination with a paste mold machine for forming articles of glassware, including a means for supporting and imparting rotative movement to the articles about their own axes during at least a part of the forming process, of means for separating a glass article from the moil which is integral therewith during the forming process and which is engaged by the supporting means of the machine, the last named means comprising means to engage and score the glass at the desired line of separation and while the moil is still supported in and being rotated by said machine about its own axis, tongs associated with said scoring means and constructed and arranged first to impact the glass article to crack it off at the score line and thereafter to guide the glass article after it has been cracked off, a rotary carrier supporting said scoring means and said tongs, means for moving said carrier in synchronism with the paste mold machine associated therewith, an endless flexible carrier arranged to travel in a path a portion of which lies around the periphery of said rotary carrier, a bottom support carried by said endless flexible carrier and arranged to be brought by the movement of said support and said carrier in registry with said tongs during the time a glass article is being cracked off from its moil and is guided by said tongs for supporting such article subsequent to the crack off, a fire finishing oven for smoothing the cracked edge of the glass article subsequent to the crack off, and means for conducting the endless carrier with said bottom support thereon through said fire finishing oven for subjecting the glass article on the bottom support to heat within the fire finishing oven.

9. Apparatus according to claim 8 wherein said bottom support is arranged for vertical movement with respect to said endless carrier, means for retaining said bottom support in its uppermost position in respect to said carrier, and means operable at a predetermined zone in the path of said endless carrier for lowering said bottom support in respect thereto sufficiently to lower the glass article carried thereby below the level of said tongs.

GEORGE E. ROWE.